United States Patent [19]

Jeschke et al.

[11] Patent Number: 5,117,365
[45] Date of Patent: May 26, 1992

[54] ELECTRONIC APPARATUS AND METHOD OF REGISTER CORRECTION

[75] Inventors: Willi Jeschke, Heidelberg; Anton Rodi, Leimen, both of Fed. Rep. of Germany

[73] Assignee: Heidelberger Druckmaschinen AG, Heidelberg, Fed. Rep. of Germany

[21] Appl. No.: 328,856

[22] Filed: Mar. 27, 1989

Related U.S. Application Data

[63] Continuation-in-part of Ser. No. 311,416, Feb. 13, 1989, which is a continuation of Ser. No. 105,410, Oct. 5, 1987, abandoned.

[30] Foreign Application Priority Data

Oct. 4, 1986 [DE] Fed. Rep. of Germany ....... 3633855

[51] Int. Cl.$^5$ .............................................. G06F 15/46
[52] U.S. Cl. ..................................... 364/468; 364/470; 101/248; 101/481; 101/DIG. 36
[58] Field of Search .............. 364/167.1, 468–471; 101/181, 248, 481, 485, 492, DIG. 36, DIG. 39, 415.1, 378, 426

[56] References Cited

U.S. PATENT DOCUMENTS

| | | | |
|---|---|---|---|
| 4,060,907 | 12/1977 | Van Hook | 33/184.5 |
| 4,223,453 | 9/1980 | Meyer | 35/13 |
| 4,264,957 | 4/1981 | Pautzke | 364/469 |
| 4,437,403 | 3/1984 | Greiner | 101/248 |
| 4,484,522 | 11/1984 | Simeth | 101/248 |
| 4,553,478 | 11/1985 | Greiner et al. | 101/426 |
| 4,596,186 | 6/1986 | Shimizu | 101/248 |
| 4,639,881 | 1/1987 | Zingher | 364/521 |
| 4,785,733 | 11/1988 | Hartung et al. | 101/181 |
| 4,785,736 | 11/1988 | Jeschke | 101/415.1 |

FOREIGN PATENT DOCUMENTS

| | | |
|---|---|---|
| 0177885 | 4/1986 | European Pat. Off. |
| 58-11156 | 1/1983 | Japan |
| 2109952 | 6/1983 | United Kingdom |

OTHER PUBLICATIONS

Mitsubishi Heavy Industries Ltd. "Telecursor System".

Primary Examiner—Jerry Smith
Assistant Examiner—Paul Gordon
Attorney, Agent, or Firm—Herbert L. Lerner; Laurence A. Greenberg

[57] ABSTRACT

A method of registration correction by turning a flexible plate about a point on a cylinder of a press, which includes determining data regarding a deviation from registration of a defined register rotation in at least one of a circumferential, side and angular position of the plate from a specimen made from the plate, and issuing adjustment commands initiating adjustment operations in devices provided in the press for respectively turning the plate and for effecting circumferential and side register, the adjustment commands taking into account the determined data, so as to finally correct the register of a pattern produced by the printing plate.

9 Claims, 5 Drawing Sheets

ELECTRONIC APPARATUS AND METHOD OF REGISTER CORRECTION

CROSS-REFERENCE TO RELATED APPLICATIONS

This application is a continuation-in-part of co-pending application Ser. No. 311,416 filed Feb. 13, 1989, which is a continuation of application Ser. No. 105,410 filed Oct. 5, 1987, now abandoned.

BACKGROUND OF THE INVENTION

Field of the Invention

The invention relates to an apparatus and method of register correction having a device for turning a flexible plate about a point on a plate cylinder, and devices for effecting adjustments in circumferential and side registers of the plate.

A device is known from German Published Non-Prosecuted Application (DE-OS) 35 41 222 for correcting the canting of a flexible plate on a cylinder. This heretofore known device includes a bearing block with a clamping element for firmly holding one end of the plate. The clamping element is formed with slots for receiving pins of a mounting block. Due to the arrangement of the slots, it is possible to turn or twist the clamping element on the cylinder, so that a canted position of the plate can be corrected. A canted position of a plate on a cylinder of a is determined with reference to a plate on the cylinder of another unit of the same machine A disadvantage of the aforesaid device lies in the fact that although it is possible merely to correct a canted disposition of a plate, it is not possible with this device to turn the plate about arbitrarily selected points on the plate in order to achieve perfect registration correction.

In machines using plates mounted on cylinders, for example in presses wherein a separate pattern is formed in a separate unit of the machine, it is of utmost importance that all patterns are in perfect registration, or else a blurred or distorted pattern will be produced. Conventional presses have in each unit a side register and a circumferential register for adjusting the position of the plate in circumferential and side direction, i.e. lateral and transverse direction. In addition, conventional presses have some means for making minor angular adjustments for a plate if it for some reason has been installed on the cylinder in a skewed or canted position. In large presses, especially presses of the web-fed offset type, it is very undesirable to stop the press to make adjustments, because during a stoppage liquids on the cylinders will start to dry and cake, and upon restart dried liquid will cause streaks and runs in the patterns.

Furthermore, it is generally known, especially in the case of web-fed presses, to correct an inclined or skewed position of a plate by adjusting the mountings of the cylinder to an inclined or skewed position in accordance with the angle of the inclined or skewed position of the plate. Although this makes possible a correction to the skewed position of the pattern, the movement of the cylinder causes a distortion in the pattern to the extent that a rectangular pattern is produced with a parallelogram-shaped shift.

It is an object of the invention to provide an apparatus and method of registration correction which affords a material improvement over heretofore known apparatus and methods of this general type.

With the foregoing and other objects in view, there is provided in accordance with one aspect of the invention, a method of registration correction which includes turning a flexible plate about a given point on a cylinder of a press, wherein the method comprises the steps of determining data relating to deviation from proper registration of a defined register point on the plate in at least one of the circumferential, side and angular position of the flexible plate, by means of a specimen pattern made from the plate, and entering the data as adjustment commands for effecting adjustment operations in devices provided in the press for respectively turning the flexible plate about said point on the cylinder and for effecting circumferential and side registration, wherein the adjustment commands take into account not only the determined data but also the location of the point on the plate cylinder about which the plate is turned, so as to completely correct the registration of a pattern made by the plate.

In accordance with another aspect of the invention, there is provided an apparatus for performing a method of register correction having a device for turning a flexible printing plate about a point on a pate cylinder of a printing press, and devices for effecting adjustments in circumferential and side registers of the flexible printing plate, further comprising a device for determining data relating to the location of a register point and register deviations of the printing plate in circumferential and side position and angular position thereof, a computer for linking the determined data with conditions of a given point about which the printing plate is turnable and for establishing respective adjustment commands for the adjustment effecting devices, and devices communicating with the computer for receiving the adjustment commands from the computer for correcting circumferential and side registration and correcting angular registration by turning the printing plate on the plate cylinder.

The invention considerably simplifies the adjusting operations for attaining proper in-registration printing. It has been necessary, heretofore, with reference to a first specimen print, to determine the inclined or skewed position of the printing plate and to straighten the latter and, then, after a further specimen print, to determine and correct the side and circumferential-register offset. Now, the data for circumferential and side registration as well as for angular registration are established and the correction performed after just one specimen print. The ensuing specimen print then shows a correct printed image.

An essential advantage of the invention is both a saving in time when setting up and also a reduction in the amount of waste which is produced.

Misaligned or mutually skewed printed images in individual printing colors may be due to various reasons. In the manufacture of a printing plate, it may happen, for example, that an image which is to be transferred onto the printing plate is projected onto the printing plate out of alignment or canted with respect to the alignment of the printing plate. Furthermore, under certain circumstances, if the printing plate is not properly clamped into the holding or supporting device of the printing plate cylinder, the printing plate may be clamped out of alignment or canted. Such a misalignment or canted position with respect to the printing plate of another printing unit in a multi-color printing press cannot be compensated for only by side and circumferential register adjustments, but can at best be reduced only to a lesser error.

An operator will detect such an error, for example, by detecting good registration in one area of a printed image and a registration deviation in another area. The printing plate must then be turned about a point in the area of good registration. From the area of registration deviation it is possible, with reference to the register center of rotation, to determine an angular adjustment of the plate, in magnitude and direction. Because the printing pate, for reasons of construction, can be turned only about a precisely defined center of rotation on the printing-plate cylinder, it is necessary, after turning the printing plate about this center of rotation, to compensate for the resultant shift in side and circumferential register.

If there is both side and circumferential and angular misalignment of a printing plate, then an area of proper registration cannot be detected on the printed image. In this case, the deviation of all three values to be corrected must be determined either by means of registration marks or directly from the registration error in the image.

A further advantage of the invention stems from the fact that certain areas of an image can be declared as vital areas, so that the registration of the plate can be performed especially for these areas.

In accordance with a further feature of the invention, input apparatus is provided for entering the registration data, wherein this input apparatus includes a data input panel. The data input panel has an area which corresponds to the printed image in either the same or a different scale. Such an input panel permits a particularly simple entry of the registration data in that the position of the registration point on the printed product can be entered identically with regard to its position, into the input panel. Likewise, the magnitude and direction of the angular adjustment can be entered into the input panel in the manner of a graphic input. Of course, it is also possible to enter registration data numerically into the input panel.

In accordance with another feature of the invention the input panel has different scale factors for the x and y-directions, in relation to the printed product This is particularly advantageous if, for example, there is only a small and limited space available on a control console of a printing press or if an existing input panel of given dimensions is to be used for entering the data.

In accordance with still another feature of the invention, the input panel is in the form of a sensor array, wherein the data are entered by means of image corresponding sensors, for example by depressing or touching sensor keys or by means of contactless inductive entry.

In accordance with an additional feature of the invention, a display array is located below the sensor array for showing the positions of the registration data that have been entered so that, as the data are being entered, they are displaced simultaneously, making it possible to make correction immediately to any data that may have been incorrectly entered. This display is particularly useful if, for example, the magnitude of an angular adjustment is entered graphically e.g. as a chord between two sides of a triangle.

In accordance with yet another feature of the invention an ink zone display and input system, of the kind used in a majority of remote-control consoles for controlling a printing press, is used as a control console for entering registration data according to the invention. Such a so-called ink zone display shows an ink density profile for the entire printing width and is formed, for example, of a multiplicity of rows and columns of light-emitting diodes, with each column being assigned to an ink-metering element and the length of each column representing the magnitude of the ink gap of the ink-metering element. The ink gap of an individual ink-metering element is indicated by the illumination of one or more light-emitting diodes in a column. By means of keys or other controls, the respective ink gap and the corresponding display can be altered. Such an ink zone display can be used advantageously to enter the data for turning the printing plate. In this case, the width of the ink zone display represents the width of the printing plate, while the length of the printing plate is represented by the length of the columns of light-emitting diodes. It is in this way possible to activate a sensor element corresponding to the position of the register point and the light-emitting diode corresponding to it and to enter and/or display the direction and magnitude of the turning angle, for example, by energizing several sensor elements, with their light-emitting diodes in a column. Of course, it is necessary, prior to such entering of the data to change the input mode and to select the printing unit in which the plate is to be turned.

It is also possible that respective display and input panels which are present on a control console of a printing press, for the purpose, for example, of adjusting the registers in the individual printing units, to be used for the graphic entry of registration data.

In accordance with yet a further feature of the invention, a light pen is used for entry of registration data. The light pen can be used on a sensor panel for entering the position of the register point and the turning angle by means of suitable light-sensitive sensors. Of course, it is also possible to use instead of a light pen an input device cooperating, for example, via an inductive coupling with the input panel, as well as to use a photoelectric-barrier grid instead of an input array, which has the advantage that no auxiliary devices are required for entering the data. In addition, a plurality of pushbuttons and keys may be used for data entry.

In accordance with a concomitant feature of the invention, the printing plate is mounted at its two ends in holding or supporting rails which are turnable and displaceable, wherein the turning of the printing plate is effected by turning the rails.

The turning motion may be accomplished, for example, by an electric motor or hydraulically by means of apparatus described in detail in copending U.S. patent application Ser. No. 013,010 filed Feb. 10, 1987 of applicant, now allowed. Return information on the turning motion may be transmitted by means of suitable sensors connected to the corresponding actuator or adjustment element.

The side and circumferential-register correction may similarly be accomplished in conventional manner with suitable actuators, for example servomotors. In an advantageous manner, already existing servomotors for the side and the circumferential registers are used for this purpose.

Other features which are considered as characteristic for the invention are set forth in the appended claims.

Although the invention is illustrated and described herein as embodied in apparatus and method of register correction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1A:
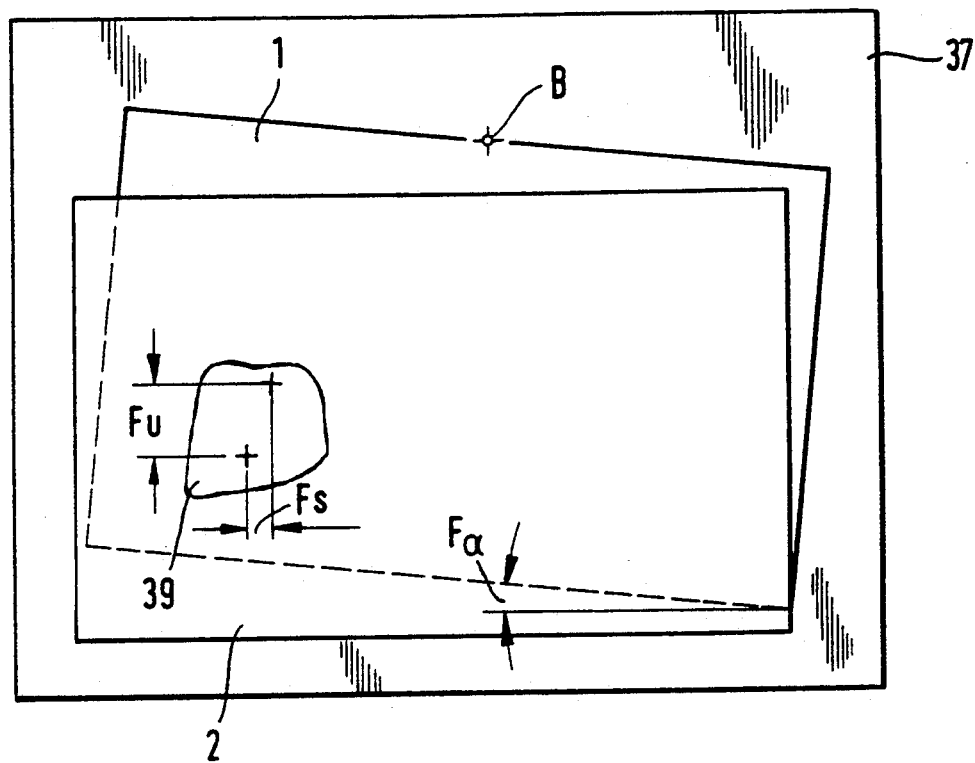
FIG. 1a is a plan view of a print having two printed images that are misaligned or rotated and offset with respect to one another.

Referring now to the drawings and first, particularly, to FIG. 1a thereof, there is shown therein a specimen print 37 with a printed image 1 of a first ink color and a printed image 2 of a second ink color. Compared with printed image 2, printed image 1 exhibits both a circumferential register offset Fu as well as a side-register offset Fs and an inclined skew position, which is defined by a skew angle Fα. The amounts of error are, of course, very small and have been very greatly exaggerated in the drawing merely for better comprehension. From this specimen print 37, a printer, for example by evaluating conventional register marks on the prints, determines register deviations and misalignment of the printed image 1 with respect to the printed image 2. The register marks are evaluated in a conventional manner, for example, by means of a measuring lens or with a register-mark reader. Of course, it is also possible to determine the register errors directly in the image. Once the register errors are determined, the three error quantities or values Fu, Fs and Fα are fed to computing apparatus via a suitable input unit, for example graphically, as will be described hereinafter. From these quantities or values, the computing apparatus produces the necessary actuating signals, i.e. for turning the printing plate 1 about its center of rotation B through an angle Fα and for circumferential and side register adjustment, wherein the register adjustment is determined in accordance with angular, lateral and transverse register offset, as determined from the specimen print 37.

Figure 1B:
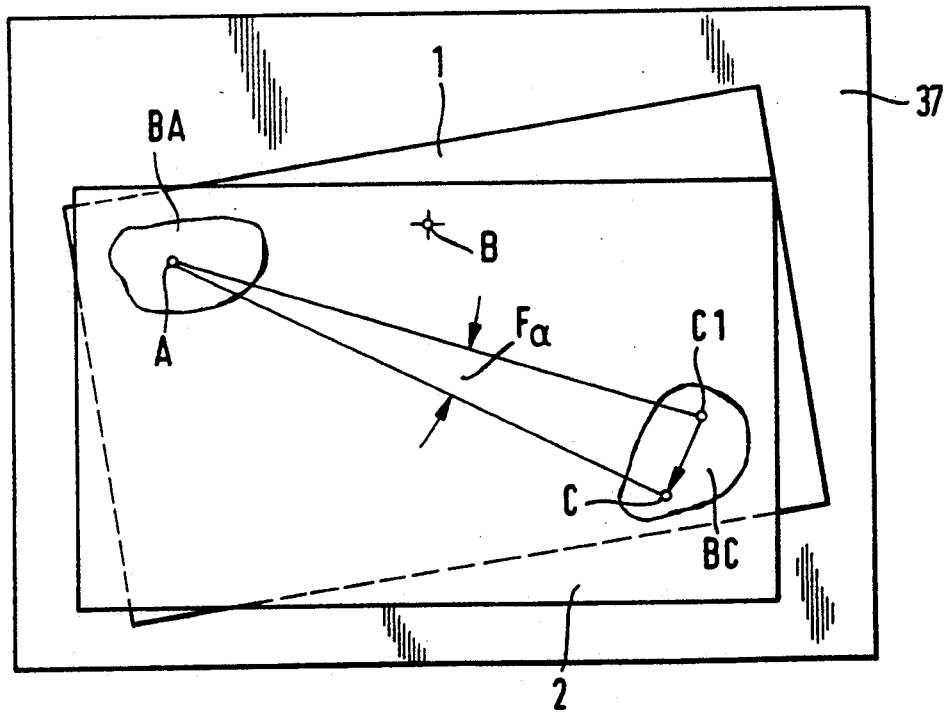
FIG. 1b is a plan view of another print having two printed images that are misaligned or rotated with respect to one another.

FIG. 1b shows a special case in which two printed images 1 and 2 are misaligned. The position of the printed image 2 is the reference position, while the printed image 1 is misaligned with respect to the printed image 2. In this example of FIG. 1b, the circumferential and side-register settings are correct, since they have a common registration point A and an area BA around point A, which shows good registration. This is a special case, because within the printed image area BA which shows good registration, while in area BC remote from the area BA, registration register deviation is caused only by the turning angle Fα. In this case it is possible to determine the turning angle Fα directly from this registration deviation. The registration adjustment data may be determined, for example, as follows: On the specimen print 37 of FIG. 1b, the printing machine operator searches for an area BA which shows good registration having a common register rotation point A located in this area BA. It is, of course, not always possible to define the position of the register rotation point exactly nor is it necessary for performing the process. The area in which there is the greatest register deviation or in which a register deviation can be found (area BC) is likewise established from the specimen print 37, and a correction point C1 on the printed image 1, which is offset with respect to a point C on the printed image 2, is located, thus permitting a determination of the distance between points C/C1 as a chord in triangle A, C, C1, which in turn permits a determination of the angle Fα. In determining the location of the area BC it is only important that a precise determination of the angle Fα can be made.

The angle Fα in FIG. 1b is determined by means of the equation:

$$\text{tangent } F\alpha = A, C / C, C1 \qquad (1)$$

wherein A, C is the length of the side A,C in the triangle A; and C, C1 is the length of the chord C, C1. The equation (1) is correct when the chord C, C1 is short in relation to the sides A, C and A, C1.

Since the angle F is normally very small, the tangent is nearly equal to the radian of the angle Fα. It follows then that $$\text{tangent } F\alpha = A, C / C, C1 \text{ radians} \qquad (2)$$

In order to attain proper registration, the printing plate carrying the printed image 1 must be turned back an angle equal to angle Fα. The register rotation point A may be located at any position. The plate 1 is turned after the determination of the angle Fα about a fixed center of rotation, shown as point B. The fixed position B is determined by the mechanical construction of the turnable printing-plate mounting device.

Of course, in a printing press with several printing units, it is possible to equip each printing-plate cylinder with a respective rotatable printing plate mount in order to be able to correct any possible skew position of any of the printed images. For this purpose, the position of one printing plate in a given printing unit may be selected as a reference position. Normally, this will be the printing unit in which the ink color best conforms to the printing standards.

Figure 2:
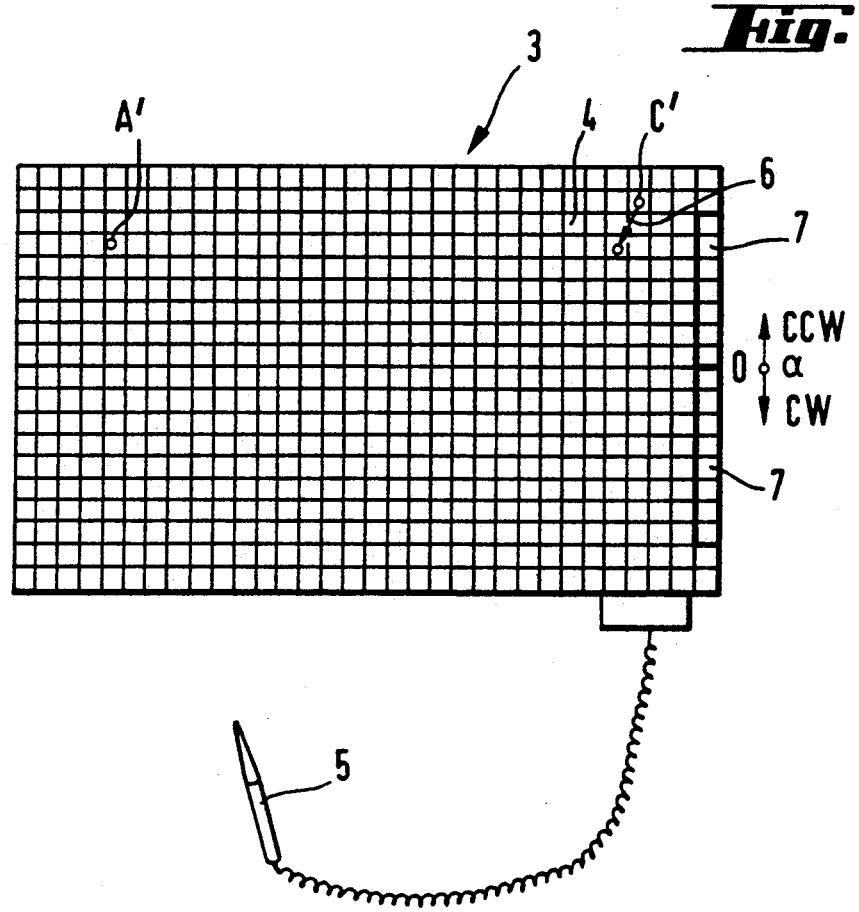
FIG. 2 is a plan view of a data input and display unit for inputting data necessary for making a correction.

FIG. 2 shows a data input unit 3 with which the data necessary for correcting the angular position can be entered graphically. Data input unit 3 has a sensor surface area 4 formed as an array of light-sensitive elements. The light-sensitive elements can be activated with a light pen 5. The sensor area 4 serves to represent the printed image, with the result that, to enter the register rotation point A' as in FIG. 1b or a desired register point in a vital image area 39 as in FIG. 1a, the light pen 5 is used on the sensor area 4 to enter the position which corresponds to the position of the register rotation point A on the printed image. In an identical manner, the correction point C' by means of which the chord C, C1 is entered, which in turn permits the determination of the angle Fα.

There are several possible ways of entering the magnitude and the direction of the turning or skew angle. Some of these are described herein. By means of a numerical keyboard, the angle and its direction can be entered directly as a chord length C, C1 and distance AC with a corresponding sign (+ or −).

With the light pen 5, the chord, starting from correction point C', can be entered with respect to magnitude and direction by moving the light pen in the direction of the arrow 6. Of course, it must be borne in mind that the magnitude of the angle must be entered on an enlarged scale in order to make it at all possible to enter very small angles.

A further possibility is to provide a chord input field 7 on the sensor area 4, which makes it possible to enter also on an enlarged scale, the chord C, C1 by moving the light pen 5 in one of the two directions of rotation CW or CCW starting from the zero point "0".

In order to show the data that have been entered, the sensor field may be provided with a display panel underlay, so that an entry of points A' and C' and of the chord length of the angle Fa is displayed immediately, allowing a subsequent comparison of the entered data with the printed image.

Instead of the light-sensitive sensors and a light pen, it is also possible, for example, to use pressure-sensitive sensors which can be activated by finger pressure. The entry of the data is not restricted to specific types of sensors and input elements. From the multiplicity of types of known sensor elements for input fields, it is possible to select the most favorable type for the particular application for the purpose of receiving input data.

Figure 3:
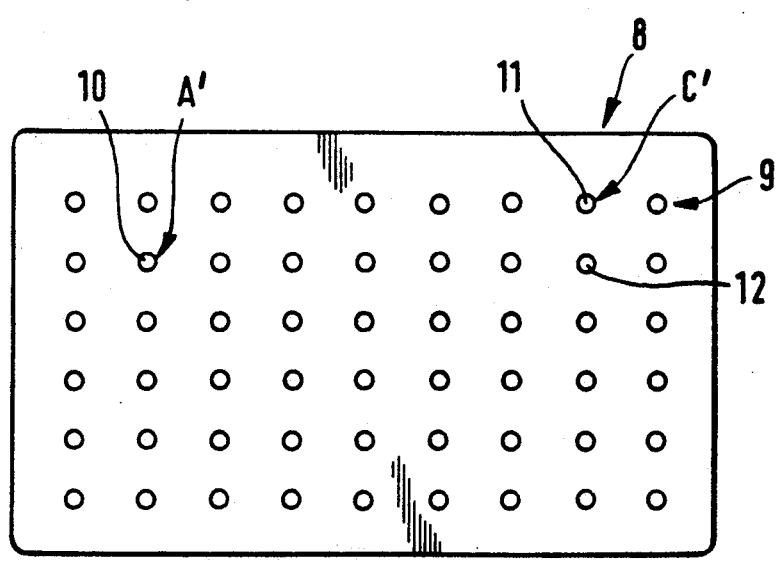
FIG. 3 is a plan view of another embodiment of a data input and display unit.

Another embodiment of the display unit is shown in FIG. 3. The input unit 8 contains a field 9 with keys or pushbuttons 12. In this case, too, the position of the register point A' is determined by pressing keys 10 and 12 located at or in the vicinity of points A', and C', and then determining the turning angle, by pressing a key 11 which is located on a vertical line through key 12 in the vicinity of key 12. The magnitude of the angle can also, for example, be entered by depressing key 11 several times, so that each actuation of the key corresponds to a given angle increment. The direction of the turning angle is, in this case, entered by pressing a key 12 adjacent to key 11, so that key 12 is positioned in the direction in which the printing plate must be turned.

The entry of the register deviations Fu and Fs seen in FIG. 1a is not shown in FIGS. 2 and 3. These can be entered in conventional manner by means of a numerical input, or directly by means of a conventional register-mark reader.

Figure 4:
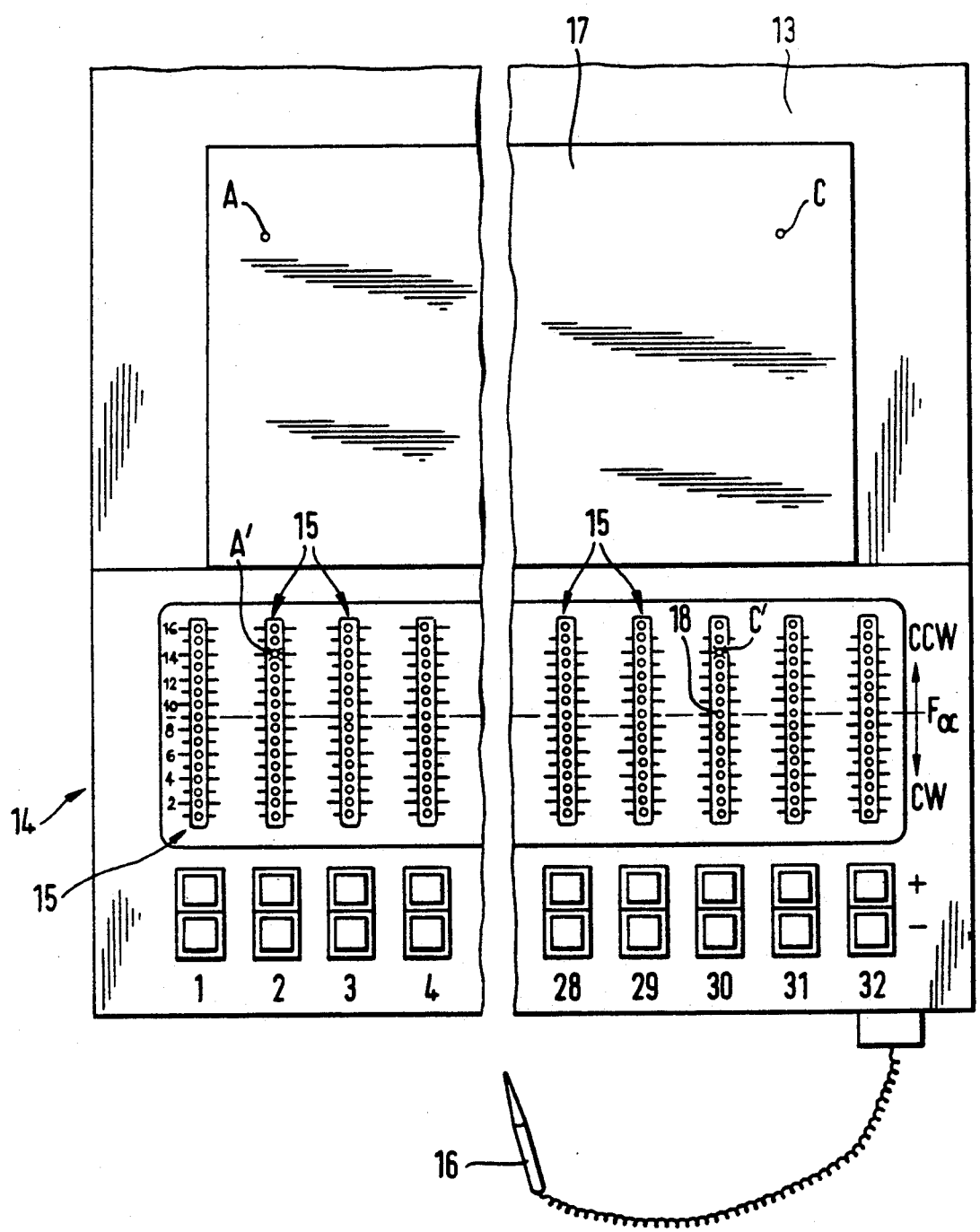
FIG. 4 is a plan view of an input and display unit for adjusting inking profile and for correcting the position of printing plates.

FIG. 4 shows still another embodiment for entering the turning angle for a printing plate. Most conventional offset printing presses, especially sheet-fed offset printing presses, have a control console which is provided for, among other things, setting the ink-layer thickness profile in the individual printing units.

Such a control console is known, for example, under the name CPC I, from the firm HEIDELBERGER DRUCKMASCHINEN AKTIENGESELLSHAFT (source HEIDELBERGER News 3/40). FIG. 4 illustrates a detail of a control and display panel of such a control console 13. An ink zone display 14 is located in a lower region of this control console. The ink zone display 14 is formed of thirty-two columns of light-emitting diodes, wherein each column of light-emitting diodes indicates the setting of an ink-metering device by means of one or two lighted light-emitting diodes. The position of the lighted diodes in a column thus corresponds to the setting of the ink-metering device in the inking unit. In this way it is possible, when a printed product 17 is placed on the control console 13 above the ink zone display 14, to control in a simple manner the inking in the individual ink zones in accordance with the correspondence between ink zones and respective columns of light-emitting diodes. A change in the setting of the metering devices can be entered by means of a light pen 16 applied at the corresponding column of light-emitting diodes. For this purpose, each light-emitting diode has a light-sensitive sensor associated therewith. Reference can be had to U.S. application Ser. No. 047,017 filed May 5, 1987, which is a continuation of Continuation-In-Part application Ser. No. 770,702, filed Aug. 29, 1985 for greater details of such a light pen, as well as for timing diagrams illustrating the application of the light pen, for example, for adjusting the profile of an ink layer or dampening-liquid thickness and/or for adjusting the registers in a printing press.

With the control console 13 and the ink zone display 14, it is possible, after changes in the input mode, to enter graphically the data for the registration correction of a printing plate. For this purpose, the location of the registration point A is entered in a specific ink zone, represented by the column of diodes corresponding to the ink zone 2. The light pen is used to enter the point which corresponds approximately to the position of the register rotation point A. The entered point is identified in FIG. 4 by reference character A' and is indicated by lighting of the corresponding light-emitting diode. The total length of the column of light-emitting diodes corresponds to the vertical length of the printed sheet. In the same manner, point C, which determines the chord of the angular correction is entered on the column of light-emitting diodes corresponding to the inking zone in which point C is located (e.g. column 30 of light-emitting diodes). Also, the vertical position of point C' is entered in the column of light-emitting diodes which corresponds to the position of the point C on the printed sheet. Point C', after entry lights up the corresponding light-emitting diode. The entry of the magnitude and the direction of the turning angle can, in this example, be accomplished in a manner similar to that shown in FIG. 2 by means of an angle entry field. For this purpose, the input mode is changed on the ink zone display, so that, for example, in the column of light-emitting diodes in which point C' was entered in column 30 of light-emitting diodes, the center light-emitting diode 18 is illuminated and, starting from this center toward light-emitting diode 14, the direction of the angle F is entered by moving the light pen in direction of the turning angle, with the magnitude of the angle Fa being indicated by the length of the distance covered with the light pen along the row column 30 of light-emitting diodes. Once again, for example, the distance between two light-emitting diodes may correspond to a given chord length of the angle Fa so that the operator has the capability of entering the magnitude of the angle with very great accuracy, for a correspondingly greater resolution. Again, it can be arranged that the angle that has been entered is displayed.

Figure 5:
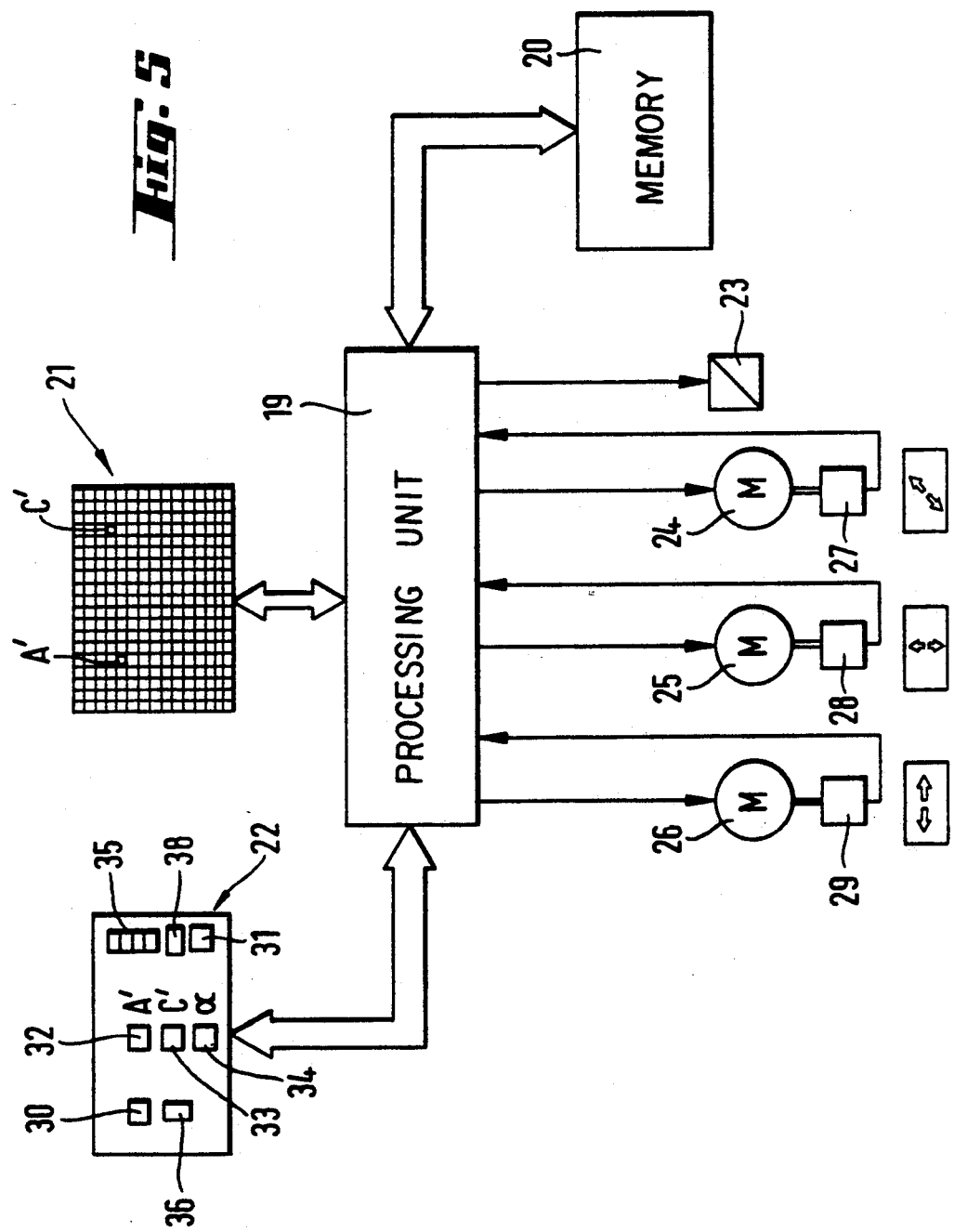
FIG. 5 is a block diagram of a system for correcting the position of a printing plate.

FIG. 5 is a block diagram with a circuit and actuators for performing a position correction of a printing plate. The block diagram contains a central processing unit 19 with which a memory 20 is associated. An input and data entry unit 21 which may be any one of units 3, 8 or 14 described above, serves for graphically entering the register rotation point A' and the correction point C', determining the angle Fa and for displaying these inputs. An additional control field or panel 22 is provided for entering additional data such as selection of a printing unit and register offsets Fs and Fu, wherein the additional control field, just like the input and display unit, is connected to the processing unit 19. The processing unit 19 is connected also to an actuator 23 for clamping and releasing a printing plate, to a servomotor 24 for turning the printing plate as well as to two servomotors 26 and 25 for respectively adjusting the side and circumferential registers. The servomotors 24, 25 and 26, are provided with respective adjustment sensors 27, 28 and 29 for providing position feedback. FIG. 5 shows, actuators, respectively only for one printing unit and for the adjustment of one printing plate in one printing unit. Of course, the printing plates of several printing units can be adjusted by the processing unit 19; the actuators for the further printing units will be similar to the actuators shown in FIG. 5.

Figure 6:
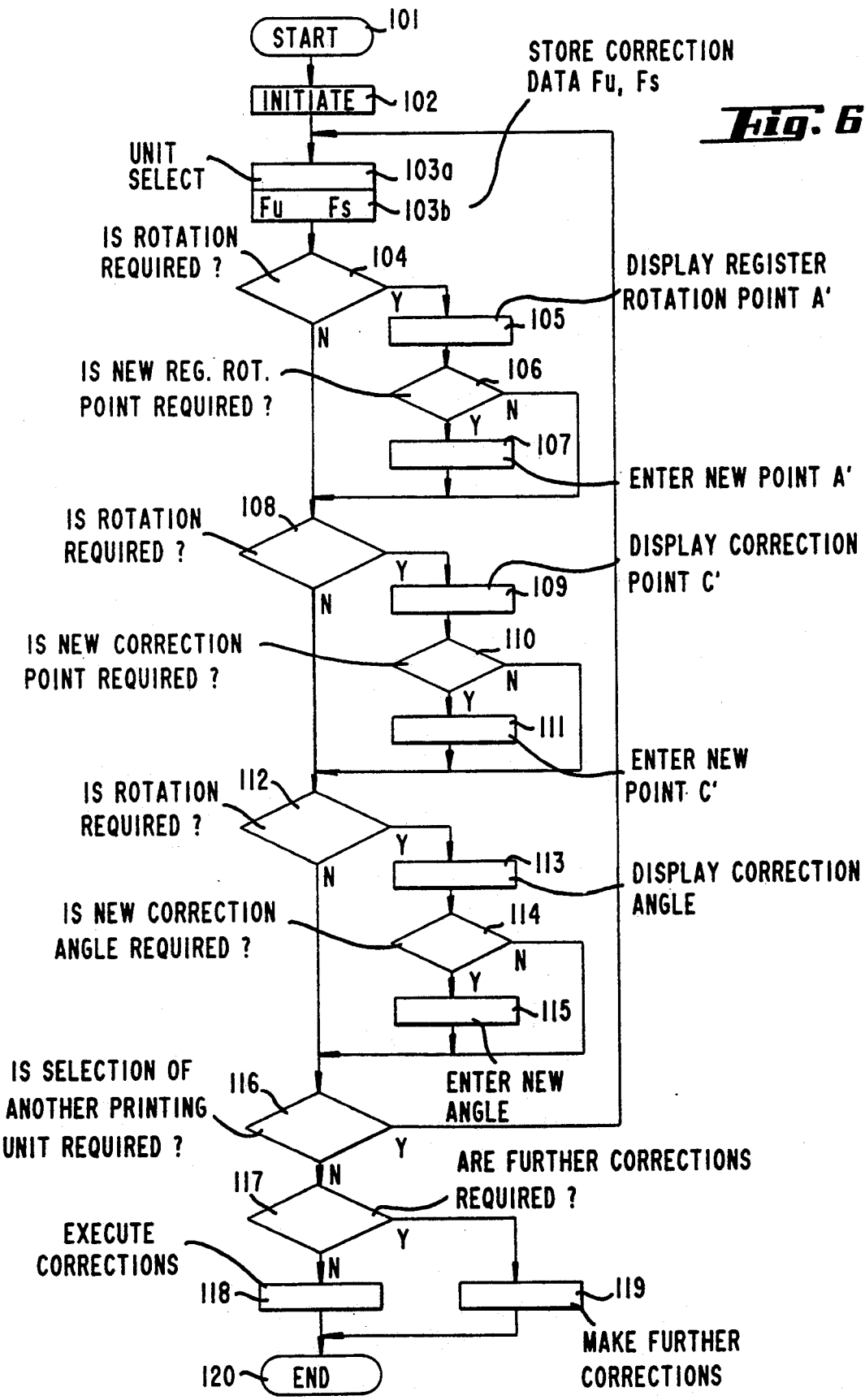
FIG. 6 is a flow chart showing the steps in the process of register correction according to the invention.

The principle of the processing unit 19 and the operation of the control panel 22 are described in greater detail hereinafter with reference to the flow chart shown in FIG. 6. The flow chart contains the process steps 101 to 120. After a start signal 101, a correction of the position of the plate is initiated in step 102 by pressing an initiating key 30 on the control panel 22. Thereafter, a selection of printing unit 103a is made by pressing one of the printing-unit selection buttons 35. The printing unit that has been selected is indicated by an illuminated display. In instruction 103b, any existing register errors Fu and FS for side and circumferential registration are entered, for example, by way of the input unit 21. In a first interrogation 104, the decision must be made as to whether a register rotation is to be entered. If an entry is not desired, there is an immediately following interrogation step 108. If register rotation is to be entered, the register rotation has to be entered by pressing the register rotation point key 32 (instructions 105); if there is already a value for the register rotation point A' in the memory 20, it is displayed on the input and display unit 21 (point A'). in the following instruction 106, there is an interrogation as to requirement for a change of register rotation point. If the displayed register point A' is not to be changed, then instruction 107 is skipped. If a change is necessary, a new value A' is entered via the input and display unit. This newly entered value is likewise displayed on the input and display unit 3, 8 or 14, while the previous value is cancelled. Furthermore, the new value is loaded into the memory 20, i.e. the previous value is overwritten. The following interrogation 108 relates to the entry and changing of the correction point C'. If this is not necessary, then interrogation 112 follows immediately. If an input is desired, the correction point is to be activated by depressing the correction point button 33 (instruction 109). If a correction point C' has already been stored, it is displayed on the input and display unit 21. In the following correction point-change interrogation 110, a decision must be made as to whether the displayed correction point is to be retained, in which case, instruction 111 (inputting of the correction point) is skipped. If a new correction point C' is to be entered, the correction point (instruction 111) must be entered by means of the input and display unit. The newly correction point C' is likewise loaded into the memory 20; the previous correction point is deleted in the memory and in the display. The interrogation 112 concerns the displaying and entering of angle Fα with respect to magnitude and direction. A no-decision leads to a printing-unit interrogation 116, while a yes-decision activates the angle display (instruction 113); an angle Fα that has been stored in the memory 20 is displayed via the input and display unit 21. After the angle button 34 on the control panel 22 has been depressed and after the stored angle Fα has been displayed, it is necessary, in interrogation 114, to decide if the previously stored angle with respect to magnitude and direction is to be retained. If affirmative, the entry of a new angle (instruction 115) is skipped. If negative, a new angle is entered likewise via the input and display unit 21. The graphic entry of the angle can be effected by the inputting methods described with reference to FIGS. 2, 3 and 4. This value, too, is stored in the memory 20, and the previously stored and the previously displayed value is deleted. The following interrogation 116 concerns the selection of a further printing unit, i.e. if the turning of a printing plate in another printing unit is also to be performed. If affirmative, the entire procedure has to be repeated; if it is not necessary to turn the printing plate in the next printing unit, then, in a following interrogation 117, it must be decided if the further adjustment of the printing plate is to be performed in accordance with the data Fu and Fs that were entered in step 103b. If, for specific reasons, further adjustment is not necessary, then, by pressing a delete button 36, the given data are deleted (instruction 119). If an adjustment is desired on the basis of the data Fu and Fs that are stored in step 103b the execute button 31 is depressed, whereupon the adjustment is performed. To execute the printing plate corrections by means of the motors 24, 25 and 26, respective motor control values are computed from the data stored in the memory 20, namely:

The coordinates of the points A and C on the printed image, the magnitude of the angle Fα from the entered chord length of the angle Fα and the coordinates of points A and C.

The coordinates of the points A and C can be computed, in a relatively simple manner in accordance with the scale factor between the size of the input field or panel and the size of the printing plate; likewise, the computation of the angle from the input or fed-in value can be performed in a relatively simple manner as described above. The adjustment of the side and circumferential register is computed in accordance with the entered circumferential and side-register corrections Fu and Fs and in accordance with the position of the register point with respect to the center of rotation B of the plate.

Once the control values for the motors are computed, the clamping of the plate that is to be adjusted is released from the plate cylinder by means of the actuator elements 23 so that a rotation is possible and, then, rotation through the angle Fα is performed with the motor 24. After this rotation, the plate is clamped again. Simultaneously or thereafter, a correction to the side and circumferential registers is made with the motors 25 and 26 in step 118. The feedback of the movements executed by the motors is accomplished via the adjustment sensors 27, 28, 29.

We claim:

1. Apparatus for performing a method of registration correction having a device for turning a flexible plate about a turning point on a plate cylinder of a printing press, and devices for effecting adjustments in circumferential and side registration of the flexible printing plate, comprising a device for determining data regarding a location of a registration rotation point and register deviations of the flexible printing plate in circumferential and side position and angular position, a computer for computing from the determined data respective adjustment commands for the adjustment effecting device, and devices communicating with said computer for receiving said adjustment commands therefrom for correcting the circumferential and side registration and turning the flexible printing plate on the cylinder, an input panel in said input device connected to said computer and representing the size of the flexible printing plate, means for entering into said input panel the location of the registration rotation point and the magnitude and direction of a chord for a turning angle required for correcting the angular portion in accordance with deviations determined from a printed product of the press.

2. Apparatus according to claim 1 wherein said input panel has a scale with respect to the flexible printing plate which is at least one of being randomly selectable and being different in x and y-directions.

3. Apparatus according to claim 1, wherein said input panel includes an array of sensors, and said input device includes means for entering at least one of the location of the registration rotation point and the magnitude and direction of the chord via the sensors of said array of sensors.

4. Apparatus according to claim 3 including a display array underlying said array of sensors for displaying the location of the registration rotation point and the magnitude and direction of the chord.

5. Apparatus according to claim 1, wherein said input panel includes an array of depressable keys for entering the location of the registration rotation point and the magnitude and direction of the chord.

6. Apparatus according to claim 5 including a display array underlying said array of keys for displaying the location of the registration rotation point and the magnitude and direction of the chord.

7. Apparatus according to claim 1, including mounting means having pivotable and displaceable support rails, and at least one adjusting element engaging said mounting means to turn the printing plate about the turning point on the plate cylinder.

8. Apparatus according to claim 1 wherein said input panel includes a display, and means for ink-quantity adjustment in inking zones of the flexible printing plate, input and display elements respectively associated with said inking zones for entering and displaying the location of the registration rotation point and the magnitude and direction of the chord after a selection of input mode.

9. Apparatus according to claim 1, wherein said input device includes a light pen connected to said computer for entering the location of the registration rotation point and the magnitude and direction of the chord.

* * * * *